April 5, 1932.          C. R. BUCHET          1,852,001
                        GREASING APPARATUS
                        Filed Oct. 19, 1927
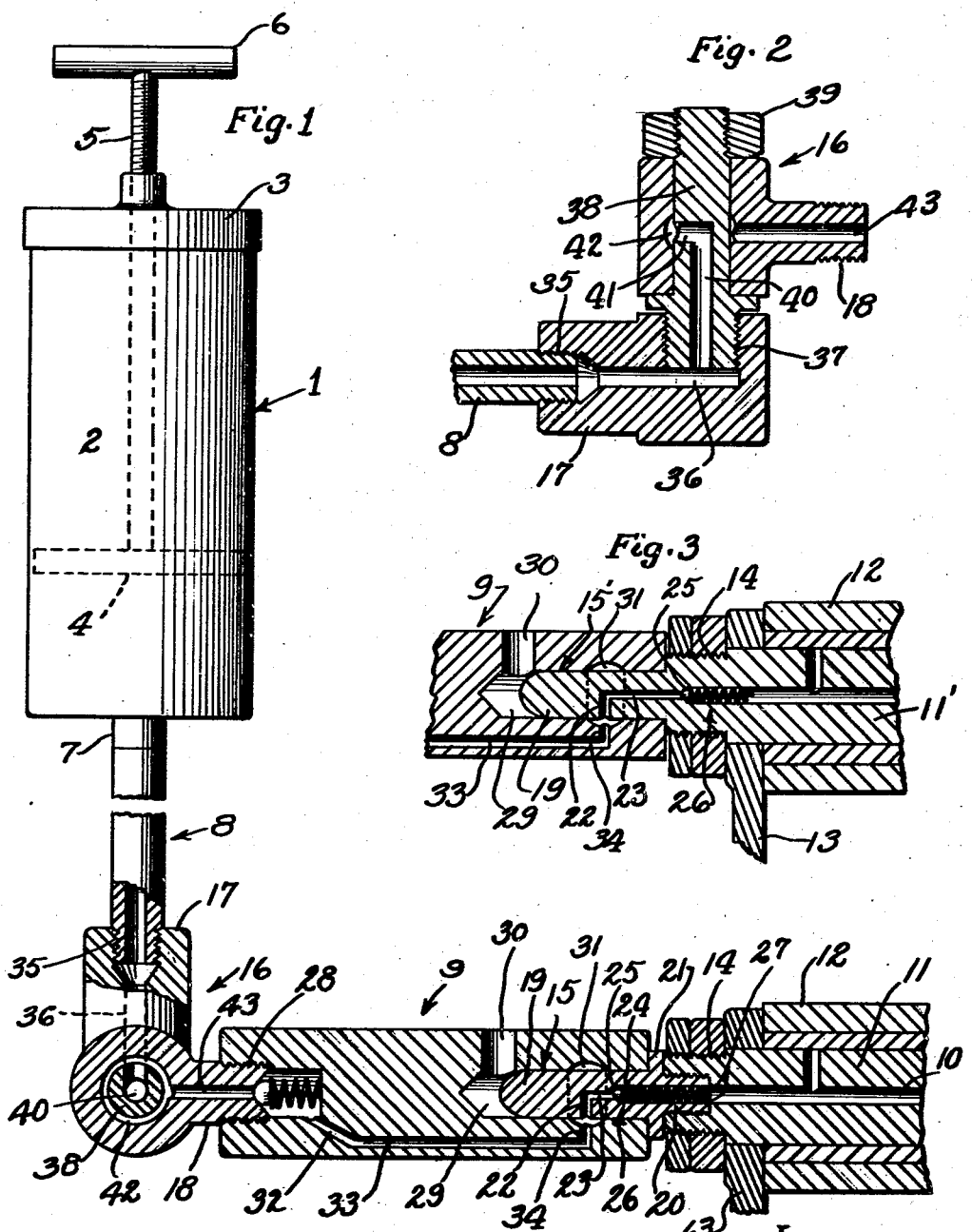
INVENTOR
CONRAD R. BUCHET Patented Apr. 5, 1932

1,852,601

UNITED STATES PATENT OFFICE

CONRAD R. BUCHET, OF LONG BEACH, CALIFORNIA, ASSIGNOR, BY MESNE ASSIGNMENTS, TO ALEMITE CORPORATION, A CORPORATION OF DELAWARE

GREASING APPARATUS

Application filed October 19, 1927. Serial No. 227,234.

This invention relates to the class of greasing devices for supplying grease, or heavy lubricant, under pressure, to grease cups, or machine bearings, and has been especially designed for use in greasing automobiles.

There are two general types of such devices, one of which requires a mechanical locking means in the connection between the greasing device and the cup of the bearing to effect and maintain a leak proof seal in the grease line which is the source of much annoyance and loss of time due to fouling by foreign matter; and, the other of which requires that the greasing device be accurately fitted and manually held to effect and maintain a working connection during the greasing operation.

An object of my invention is to provide means, affording simple connection between a greasing device and a grease cup, which automatically acts to effect and maintain a sealed mechanical fit and obviates the requirement for either a mechanical lock or manual holding of the greasing device during operation.

Another object is to provide a connection, between a greasing device and a grease cup, in which a simple relative fitting of parts, to effect mechanical connection, frees the related surfaces of the fitted parts of foreign matter so that upon final and full fitting of the parts, the grease line between the device and the cup will be fully open and rid of fouling matter.

A broadly new, basic and pioneer feature of the invention is a pressure neutralizer, in a grease line comprising separable parts, acting to overcome a tendency of the parts to separate during operation and to obviate requirement for mechanically locking or manually holding the parts.

Another broadly new, basic and pioneer feature is a coupling, for separable parts of a grease line, comprising telescopically related elements, each of which includes a portion of the grease line and a lateral branch of the grease line opening to the perimeter of the element so that upon a fitting of the elements to effect communication between the two portions of the grease line the joining surfaces of the two parts will be freed from foreign matter tending to clog the grease line.

Advantages incident to the invention are automatic holding and self cleaning of the coupled parts of a grease line.

Other objects, advantages and features of invention may appear from the accompanying drawings, the subjoined detailed description and the appended claims.

The accompanying drawings illustrate the invention.

Figure 1 is an elevation, partly in section, of a greasing apparatus constructed in accordance with my invention, the cup of which is shown as connected with a spring shackle of an automobile.

Fig. 2 is a fragmental axial section in one horizontal axial plane, of the flexible tube and the swivel joint, the flexible tube and its swivel member being turned to the horizontal plane of the swivel element of the adapter.

Fig. 3 is a fragmental sectional detail showing a modified form in which the grease cup element is an integral part of the bearing.

1 designates a source of grease, or other liquid, under pressure, which is shown as comprising a cylindrical container 2; a removable and replaceable cap 3; a plunger 4; a plunger stem 5 for threaded connection with the cap and having an operating handle 6 and an outlet 7, in the form of a threaded nipple.

Secured to the container, as by threading to the outlet nipple is a tube 8 and carried at the free end of the tube is a coupling element, which will hereinafter be referred to as the adapter 9, for connecting the tube with the grease duct 10 of a bearing. I have arbitrarily shown the bearing as the spring shackle bearing of an automobile having the recited grease duct formed as an axial bore in the shackle bolt 11, which connects the spring ends 12 with the links 13.

In the end of the bolt and for communication with the grease duct is an internally threaded bore 14 for the reception of a coupling element, which will be hereinafter termed the cup or nipple 15 and which is a companion to the adapter 9.

In order that the tube may be capable of withstanding relatively hard and rough usage I prefer to construct it of metal and in order to provide flexibility in the tube for selective relative angularity between the adapter and the source of grease supply, I provide an all metal swivel 16, between the tube and adapter, having its one part, or arm, 17 threaded to the tube and its other part, or arm, 18 threaded to the adapter.

The cup 15 has a substantially cylindrical body 19 for projection beyond the end of the shackle bolt 11; has at its inner end a threaded shank 20 for seating in the threaded bore 14 of the shackle bolt and at the base of the shank a wrench seat 21. At the approximate longitudinal center of the body 19 is a transverse bore 22, which leads from the periphery to the approximate center of the body and formed axially of the body, intersecting the bore 22 is a bore 23, of substantially the diameter of the bore 22, which extends in a direction toward the shank 20 and only a relatively short distance from the transverse bore. A bore 24 of greater diameter than the bore 23 leads from the inner, or shank, end of the cup to provide communication between the bore 23 and the duct 10 of the shackle and at its meeting point with the bore 23 forms a seat 25 for the ball of a check valve 26, comprising a spring which occupies the bore 24 and impinges the ball to hold it normally seated or closed and which spring is held in the bore as by peening, or burring, the end of the bore as at 27.

The adapter 9, is by preference constructed as a metallic unit of cylinder shape, having at its one end means such as threads 28 for connection with the tube 8, or more specifically to the arm 18 of the swivel 16, and at its opposite end with a bore 29, which is smooth and dimensioned to exactly fit over the cup, and is open at the outer end of the adapter. Leading from the inner end of the bore 29 and opening at the periphery of the adapter is a bore 30 providing for the escape of air trapped during the placement of the adapter over the cup and for clearance of fouling matter lodged either on the cup or in the bore of the adapter. Within the length of the bore and at a point intersecting the transverse bore 22 of the cup, as when seated in the adapter, is an annular reduction, or neutralizing chamber 31, which communicates with the tube 8 through bores 32, 33 and 34 formed in the adapter body.

In the construction of the swivel 16 I employ as a connection between the two parts, or arms 17 and 18, a sealed leak proof joint freed from "end thrusts" substantially similar to the joint between the adapter and cup. As shown in Fig. 2, the arm 17 has formed in its one end a threaded bore 35 to receive the threaded end of the tube 8 leading from which is a longitudinal bore 36 and leading from the bore 36 is a right angled bore 37 that receives a pivot 38 bearing threads at each end and adapted to support the arm 18 and a securing nut 39 and in which pivot is a bore 40 having a right angled branch 41.

In the arm 18 is an annular chamber 42 for communication with the branch of the bore in the pivot and leading away from the chamber at a right angle is a bore 43 for communication with the adapter. This form of swivel acts freely at all times and is not subject to binding at times when there is relatively high liquid pressures therein.

In Fig. 3 the cup 15' is formed as an integral part of the shackle bolt 11' and its operation and relation to the adapter is identical with the form shown in Fig. 1.

While I have designated my device as a greasing apparatus and have stressed its advantageous use in connection with the greasing of bearings, I in no sense wish to be understood as limiting the use of my invention to such single purpose, as I have found it to be highly advantageous in the flushing of bearings by a cleaning fluid such as gasoline.

I claim:

1. Lubricating apparatus of the class described, comprising a substantially cylindrical nipple having a duct extending a portion of the length and opening in the side thereof, a unitary cylindrical coupling member having an axial bore in one end thereof adapted to receive the cylindrical portion of said nipple, a lateral port at the inner end of said bore opening to the atmosphere, and a grease conducting duct communicating with said bore at a point adjacent that taken by the opening in said nipple when the coupling is forced over said nipple.

2. In high pressure lubricating apparatus, the combination of a lubricant receiving nipple having means for attachment to a bearing, and having a smooth cylindrical outwardly projecting portion, a grease passageway formed in said nipple and opening in the side thereof, a unitary coupling member, said coupling member having a bore longer than the cylindrical portion of said nipple and adapted to receive and make a lubricant tight fit therewith, a port at the inner end of said bore opening to the atmosphere, an annular enlargement at the mid portion of said bore and a lubricant duct therein communicating with said annular enlargement of said bore and with a lubricant conduit.

In testimony whereof, I have hereunto set my hand at Los Angeles, California, this 7th day of October, 1927.

CONRAD R. BUCHET.